US012688130B2

(12) United States Patent
Kono et al.

(10) Patent No.: US 12,688,130 B2
(45) Date of Patent: Jul. 21, 2026

(54) VEHICLE-MOUNTED DEVICE, INFORMATION PROCESSING METHOD, AND INFORMATION PROCESSING PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Hitoshi Kono, Yokkaichi (JP); Hideki Maeda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 55 days.

(21) Appl. No.: 18/872,674

(22) PCT Filed: May 1, 2023

(86) PCT No.: PCT/JP2023/017043
§ 371 (c)(1),
(2) Date: Dec. 6, 2024

(87) PCT Pub. No.: WO2023/238555
PCT Pub. Date: Dec. 14, 2023

(65) Prior Publication Data
US 2025/0355814 A1 Nov. 20, 2025

(30) Foreign Application Priority Data
Jun. 10, 2022 (JP) ................................. 2022-094546

(51) Int. Cl.
*G06F 12/14* (2006.01)
*G06F 21/57* (2013.01)
*G06F 11/07* (2006.01)

(52) U.S. Cl.
CPC ........ *G06F 12/1491* (2013.01); *G06F 21/575* (2013.01); *G06F 11/07* (2013.01); *G06F 12/14* (2013.01); *G06F 2212/1052* (2013.01)

(58) Field of Classification Search
None
See application file for complete search history.

(56) References Cited

U.S. PATENT DOCUMENTS

2010/0031360 A1* 2/2010 Seshadri ................. G06F 21/74
726/28
2010/0106954 A1 4/2010 Muchsel et al.
(Continued)

FOREIGN PATENT DOCUMENTS

EP 3617927 A1 3/2020
JP 2009-129101 A 6/2009
(Continued)

OTHER PUBLICATIONS

International Search Report, Application No. PCT/JP2023/017043, mailed Jun. 13, 2023. ISA/Japan Patent Office.

*Primary Examiner* — Ali H. Cheema
(74) *Attorney, Agent, or Firm* — Brooks Kushman P.C.

(57) ABSTRACT

A vehicle-mounted device includes a processor capable of setting three or more authority levels related to memory access, wherein a higher authority level than authority levels of an OS and an application is set for an abnormality notification function of notifying a memory access violation to an outside of the vehicle-mounted device.

9 Claims, 6 Drawing Sheets

(56) References Cited

U.S. PATENT DOCUMENTS

| | | | |
|---|---|---|---|
| 2010/0333101 A1* | 12/2010 | Pope | H04L 47/10 |
| | | | 718/103 |
| 2013/0024937 A1* | 1/2013 | Glew | G06F 21/577 |
| | | | 726/23 |
| 2014/0040584 A1 | 2/2014 | Muchsel et al. | |
| 2015/0199514 A1 | 7/2015 | Tosa et al. | |
| 2017/0220795 A1* | 8/2017 | Suginaka | G06F 21/54 |
| 2019/0166126 A1* | 5/2019 | Lazarovitz | H04L 43/065 |
| 2021/0049112 A1* | 2/2021 | Xiao | G06F 21/53 |
| 2021/0090677 A1* | 3/2021 | Craske | G06F 9/3005 |

FOREIGN PATENT DOCUMENTS

| | | | | |
|---|---|---|---|---|
| JP | 2010207537 | A | * | 9/2010 |
| JP | 2012137946 | A | * | 7/2012 |
| JP | 2014-137734 | A | | 7/2014 |
| JP | 2021-093002 | A | | 6/2021 |

* cited by examiner

VEHICLE-MOUNTED DEVICE, INFORMATION PROCESSING METHOD, AND INFORMATION PROCESSING PROGRAM

CROSS-REFERENCE TO RELATED APPLICATIONS

This application is the U.S. national stage of PCT/JP2023/017043 filed on May 1, 2023, which claims priority of Japanese Patent Application No. JP 2022-094546 filed on Jun. 10, 2022, the contents of which are incorporated herein.

TECHNICAL FIELD

The present disclosure relates to a vehicle-mounted device, an information processing method, and an information processing program.

BACKGROUND

Conventionally, technology has been developed to detect and deal with unauthorized access to memory regions by software.

JP 2014-137734A discloses the following information processing device. The information processing device includes: a CPU that repeatedly executes each of a plurality of applications stored in memory; and a memory access monitoring means in which permission information specifying whether access to the memory is permitted or prohibited is registered in association with an address where data of each application is stored, the information processing device further includes: a data saving means that, if the memory access monitoring means detects prohibited memory access by the CPU executing an application, saves data stored at an address accessed by the CPU from the memory to a save area in association with the address; a permission information changing means that changes the permission information so as to permit memory access to the address; and a backup means that, after the CPU executing the application that has performed the prohibited memory access accesses the address, backs up the data at the accessed address from the memory to a backup region in association with the address, wherein the backup means restores the data in the backup region to the address associated with the data in the backup region before the next time the CPU executes the application that has performed the prohibited memory access.

For example, in the case where a microcomputer detects unauthorized access to a memory region during execution of an operating system (OS) or an application, the microcomputer causes memory exception processing to occur. If the microcomputer does not have a hypervisor, the microcomputer cannot return to normal processing from memory exception processing. Hence, in order to notify the outside of the microcomputer of the occurrence of memory exception processing, a mechanism for notifying the outside of the microcomputer after restarting the microcomputer is required.

The present disclosure has been made to solve the problem stated above, and has an object of providing a vehicle-mounted device, an information processing method, and an information processing program that can more easily notify a memory access violation to the outside.

SUMMARY

A vehicle-mounted device according to the present disclosure includes a processor capable of setting three or more authority levels related to memory access, wherein a higher authority level than authority levels of an OS and an application is set for an abnormality notification function of notifying a memory access violation to an outside of the vehicle-mounted device.

An aspect of the present disclosure can be implemented not only as a vehicle-mounted device including such a characteristic processing unit but also as a semiconductor integrated circuit that implements the whole or part of the vehicle-mounted device or as a system that includes the vehicle-mounted device.

Advantageous Effects

According to the present disclosure, it is possible to more easily notify a memory access violation to the outside.

DETAILED DESCRIPTION OF PREFERRED EMBODIMENTS

Figure 1:
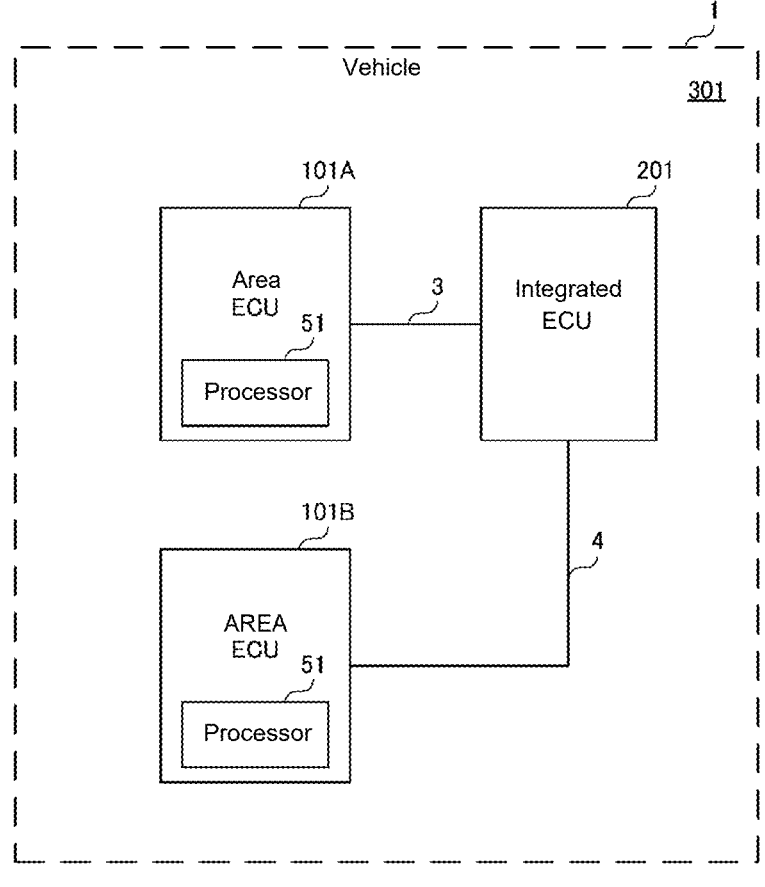
FIG. 1 is a diagram showing the structure of a vehicle-mounted system according to an embodiment of the present disclosure.

First, embodiments of the present disclosure will be listed and described.

In a first aspect, a vehicle-mounted device according to an embodiment of the present disclosure includes a processor capable of setting three or more authority levels related to memory access, wherein a higher authority level than authority levels of an OS and an application is set for an abnormality notification function of notifying a memory access violation to an outside of the vehicle-mounted device.

With this structure, in a state in which the OS is hijacked, the memory access violation notification function can be prevented from being hijacked as well, and the notification function with a higher authority level can be started. Therefore, the processor does not need to have a hypervisor capable of executing a plurality of OSs in parallel, and there is no need for a mechanism for notifying a memory access violation after restarting the processor. Thus, a memory access violation can be more easily notified to the outside.

In a second aspect according to the first aspect, the processor may be capable of setting a first authority level, a second authority level higher than the first authority level, and a third authority level higher than the second authority level, and the first authority level may be set for the application, the second authority level for the OS, and the third authority level for the abnormality notification function.

With this structure, an appropriate authority level can be set for each piece of software. For example, it is possible to prevent the abnormality notification function from being hijacked when the OS is hijacked. It is also possible to prevent the OS from being hijacked when the application is hijacked, thus preventing a decrease in OS security.

In a third aspect according to the second aspect, in the processor, the third authority level may be further set for a boot loader.

With this structure, the number of authority levels can be set to three, including the one set for the boot loader. This can simplify the mechanism for setting authority levels.

In a fourth aspect according to any of the first through the third aspects, after notifying the memory access violation, the abnormality notification function may select whether to stop the abnormality notification function or restart the processor based on a determination result of a notification destination regarding the memory access violation.

With this structure, the type of abnormality processing to be performed by the vehicle-mounted device in which the memory access violation has occurred can be determined, for example, by a device that recognizes the structure of the vehicle-mounted system, so that more appropriate abnormality processing can be performed.

In a fifth aspect according to the fourth aspect, the determination result provided to the vehicle-mounted device that has notified the memory access violation may indicate restart of the processor if the vehicle-mounted device is an infotainment vehicle-mounted device, and indicate stop of the abnormality notification function if the vehicle-mounted device is not the infotainment vehicle-mounted device.

With this structure, for example from the viewpoint of vehicle running, restart of the vehicle-mounted device can be selected, or system stop can be selected in the case where restarting one vehicle-mounted device causes another vehicle-mounted device to be restarted.

In a sixth aspect, an information processing method according to an embodiment of the present disclosure is an information processing method in a vehicle-mounted device that includes a processor capable of setting three or more authority levels related to memory access, the information processing method including: a step in which the processor sets a higher authority level than authority levels of an OS and an application for an abnormality notification function of notifying a memory access violation to an outside of the vehicle-mounted device; and a step in which the processor detects the memory access violation by the OS or the application and starts the abnormality notification function.

With this method, in a state in which the OS is hijacked, the memory access violation notification function can be prevented from being hijacked as well, and the notification function with a higher authority level can be started. Therefore, the processor does not need to have a hypervisor capable of executing a plurality of OSs in parallel, and there is no need for a mechanism for notifying a memory access violation after restarting the processor. Thus, a memory access violation can be more easily notified to the outside.

In a seventh aspect, an information processing program according to an embodiment of the present disclosure is an information processing program for use in a vehicle-mounted device that includes a processor capable of setting three or more authority levels related to memory access, the information processing program causing a computer to function as: a setting unit configured to set a higher authority level than authority levels of an OS and an application for an abnormality notification function of notifying a memory access violation to an outside of the vehicle-mounted device; and a detection unit configured to detect the memory access violation by the OS or the application and start the abnormality notification function.

With this structure, in a state in which the OS is hijacked, the memory access violation notification function can be prevented from being hijacked as well, and the notification function with a higher authority level can be started. Therefore, the processor does not need to have a hypervisor capable of executing a plurality of OSs in parallel, and there is no need for a mechanism for notifying a memory access violation after restarting the processor. Thus, a memory access violation can be more easily notified to the outside.

Embodiments of the present disclosure will be described below with reference to the drawings. The same or corresponding parts are given the same reference marks in the drawings and their description will not be repeated. The embodiments described below may be at least partly combined in any way.

Structure and Operation

FIG. 1 is a diagram showing the structure of a vehicle-mounted system according to an embodiment of the present disclosure. Referring to FIG. 1, a vehicle-mounted system 301 includes an integrated electronic control unit (ECU) 201 and one or more area ECUs 101. The vehicle-mounted system 301 is mounted on a vehicle 1.

The integrated ECU 201 and an area ECU 101A are connected via a cable 3. The integrated ECU 201 and an area ECU 101B are connected via a cable 4. The network topology of the integrated ECU 201 and the area ECUs 101 may be a bus type, or a star type with the integrated ECU 201 at the center.

The cables 3 and 4 are transmission lines conforming to a standard such as CAN (Controller Area Network) (registered trademark), CAN FD (CAN with Flexible Data Rate), CAN XL, FlexRay (registered trademark), MOST (Media Oriented Systems Transport) (registered trademark), Ethernet (registered trademark), or LIN (Local Interconnect Network).

For example, the area ECU 101A generates detection information based on the detection result of a detection device (not shown) connected to the area ECU 101A, and transmits a frame in which the generated detection information is stored to the integrated ECU 201.

The integrated ECU 201 is a central unit that processes the detection information received from the area ECU 101A. The integrated ECU 201 generates control information for controlling an actuator (not shown), and transmits a frame in which the generated control information is stored to the area ECU 101B. The area ECU 101B receives the control information from the integrated ECU 201, and drives the actuator connected to the area ECU 101B based on the received control information.

The integrated ECU 201 has the below-described abnormality monitoring function. Each of the area ECUs 101A and 101B is an example of a vehicle-mounted device, and includes a processor 51. The area ECUs 101A and 101B have the below-described abnormality notification function.

The vehicle-mounted system 301 may include two or more integrated ECUs 201. The vehicle-mounted system 301 may include a gateway device instead of the integrated ECU 201. The vehicle-mounted system 301 may include one area ECU 101 or three or more area ECUs 101.

Figure 2:
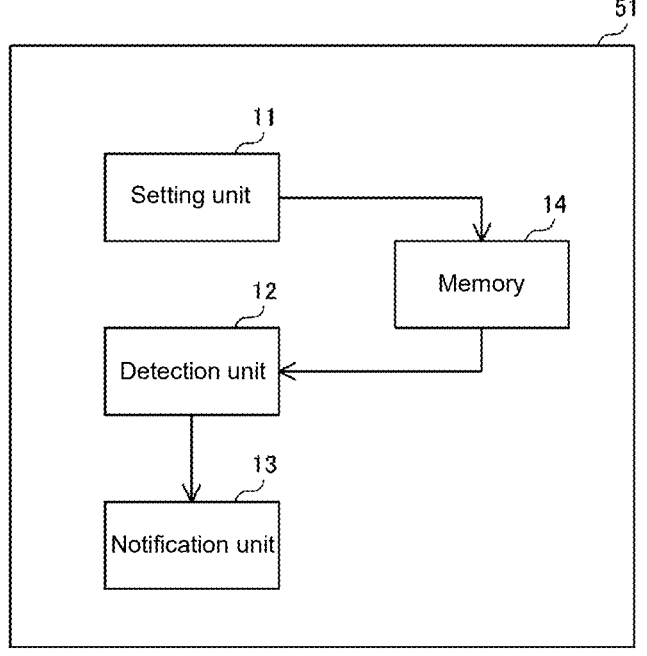
FIG. 2 is a diagram showing the structure of a processor in a vehicle-mounted device according to the embodiment of the present disclosure.

FIG. 2 is a diagram showing the structure of the processor in the vehicle-mounted device according to the embodiment of the present disclosure. Referring to FIG. 2, the processor 51 includes a setting unit 11, a detection unit 12, a notification unit 13, and a memory 14. The setting unit 11, the detection unit 12, and the notification unit 13 are implemented by the core of the processor 51.

The notification unit 13 has an abnormality notification function of notifying the outside of the area ECU 101 of an access violation to the memory 14 (hereafter also referred to as a memory access violation).

The setting unit 11 sets a higher authority level for the abnormality notification function than the authority levels of the operating system (OS) and applications in the below-described memory protection unit (MPU) settings in the memory 14.

The detection unit 12 monitors access to the memory 14 by each piece of software in the processor 51. The detection unit 12 references the MPU settings in the memory 14, and, if a memory access violation by the OS or an application is detected, starts the abnormality notification function of the notification unit 13.

For example, the processor 51 detects an attack on the vehicle-mounted network of the vehicle 1 as a memory access violation.

Figure 3:
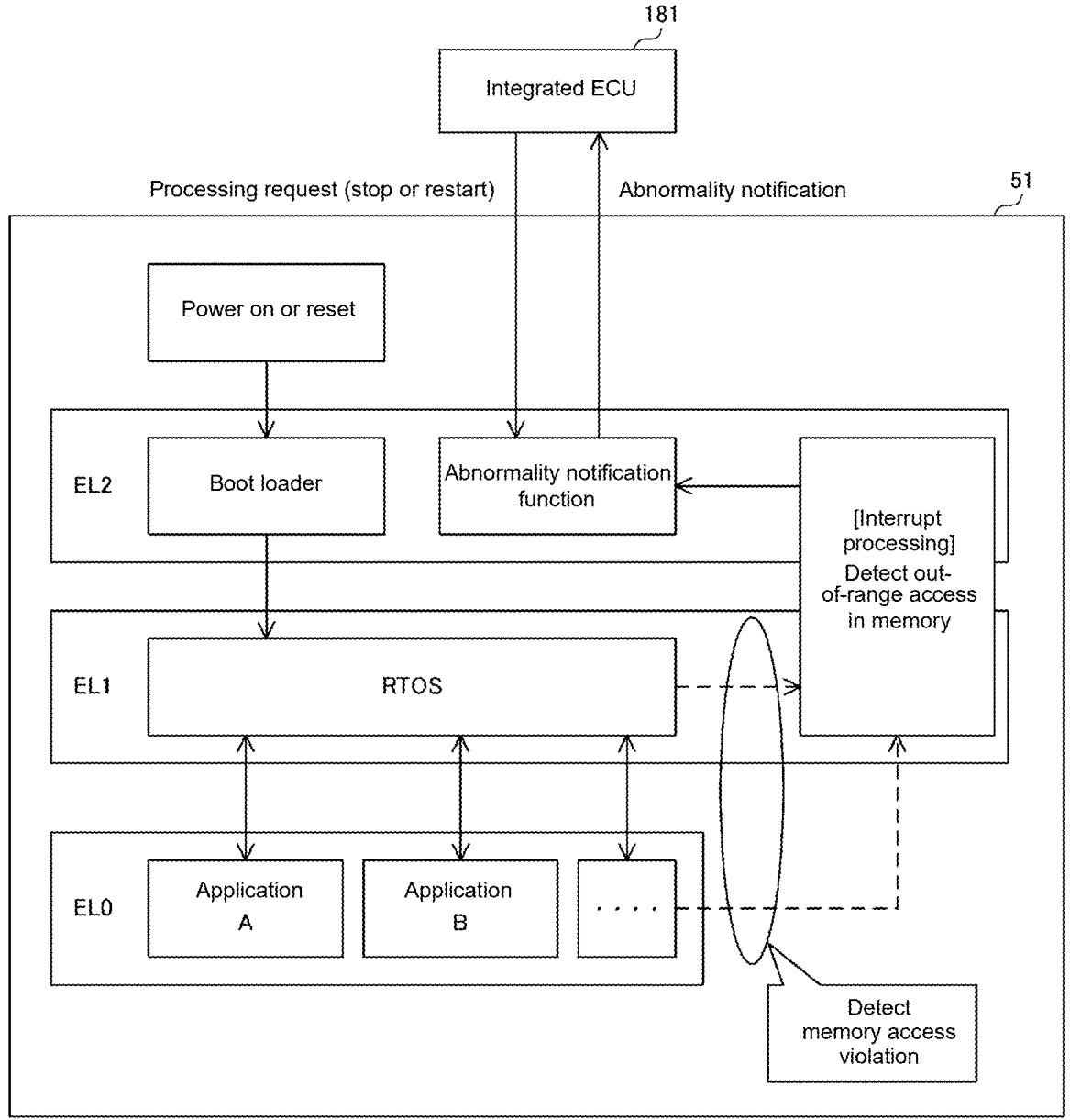
FIG. 3 is a diagram showing an example of the software structure of a processor in an area ECU and processing in the event of a memory access violation according to the embodiment of the present disclosure.
Figure 4:
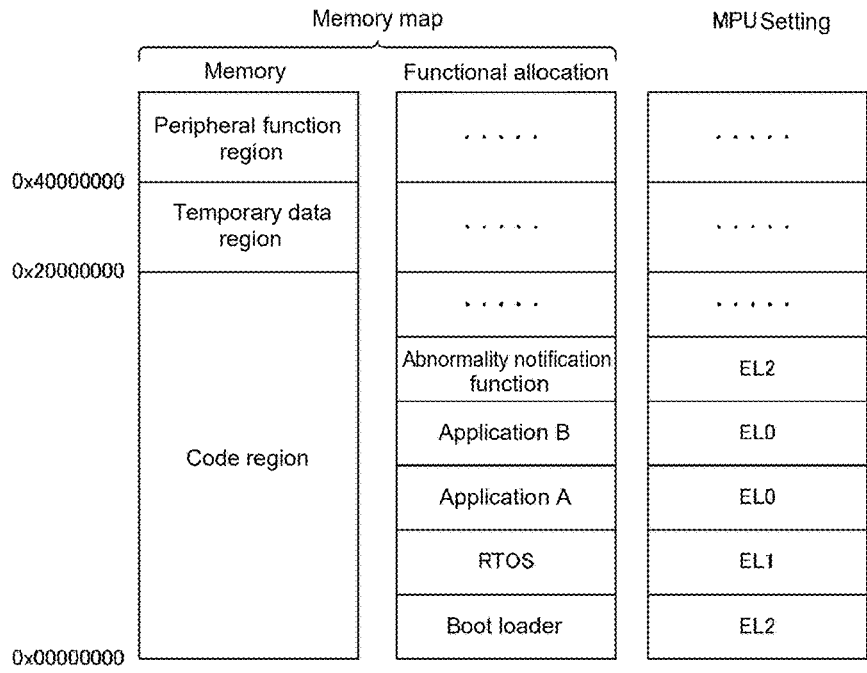
FIG. 4 is a diagram showing an example of a memory map and MPU settings of the processor in the area ECU according to the embodiment of the present disclosure.

FIG. 3 is a diagram showing an example of the software structure of the processor in the area ECU and processing in the event of a memory access violation according to the embodiment of the present disclosure. FIG. 4 is a diagram showing an example of a memory map and MPU settings of the processor in the area ECU according to the embodiment of the present disclosure.

Referring to FIGS. 3 and 4, the processor 51 is equipped with a boot loader, a real time operating system (RTOS), one or more applications, and the abnormality notification function.

Specifically, the boot loader, the RTOS as an example of the OS, the one or more applications, and a program for the abnormality notification function are stored in a code region of the memory 14. A temporary data region and a peripheral function region are also allocated in the memory 14.

The processor 51 is capable of setting three or more authority levels related to memory access. In the processor 51, a higher authority level than the authority levels of the OS and applications is set for the abnormality notification function.

For example, the processor 51 can set a first authority level, a second authority level higher than the first authority level, and a third authority level higher than the second authority level for software such as the boot loader, the applications, the OS, and the abnormality notification function. The first authority level is set for the applications, the second authority level is set for the OS, and the third authority level is set for the abnormality notification function. Moreover, in the processor 51, for example the third authority level is set for the boot loader.

Specifically, in the memory protection unit (MPU) settings, exception level 2 (EL2) is set for the boot loader, EL1 is set for the RTOS, EL0 is set for applications A and B, and EL2 is set for the abnormality notification function. EL2, EL1, and EL0 are examples of authority levels that each represent the execution authority of software, and decrease in authority level in this order. In the processor 51, software is prohibited from accessing a memory region corresponding to an authority level higher than the authority level of the software.

For example, the MPU settings are stored in a microcomputer function region (not shown) of the memory 14. The processor 51 includes a program counter for each authority level.

The processor 51 may be capable of setting four or more authority levels. For example, EL3 higher than EL2 may be set for the boot loader.

When the processor 51 is powered on or reset, the boot loader starts up and starts the RTOS, and then the RTOS starts various applications.

The processor 51 has an MPU setting function. The processor 51 detects a memory access violation according to the MPU settings. The memory access violation is detected, for example, by the core of the processor 51. If the processor 51 detects a memory access violation, specifically, if the processor 51 detects access by an application to a memory region of another application or to a memory region of EL1 or higher, the processor 51 causes exception processing (hereafter also referred to as memory exception processing) to occur. Moreover, if the processor 51 detects access by the RTOS to a memory region of EL2 or higher, the processor 51 causes memory exception processing to occur.

For example, as memory exception processing, interrupt processing at the next higher authority level occurs. Specifically, in the case of a memory access violation by an application, interrupt processing at EL1 occurs. In the case of a memory access violation by the RTOS, interrupt processing at EL2 occurs. Such interrupt processing starts the abnormality notification function of EL2.

The abnormality notification function performs a notification process. For example, the abnormality notification function initializes itself and the functions of the processor 51 necessary for abnormality notification, such as the Ethernet function, and transmits an abnormality notification to the integrated ECU 201.

For example, after notifying a memory access violation, the abnormality notification function selects whether to stop the abnormality notification function or restart the processor 51 based on the determination result of the notification destination regarding the memory access violation.

In more detail, for example, if the area ECU 101 that has notified the memory access violation is an infotainment ECU, the integrated ECU 201 provides the area ECU 101 with a determination result indicating system restart, i.e. restart of the processor 51. If the area ECU 101 that has notified the memory access violation is not an infotainment ECU, the integrated ECU 201 provides the area ECU 101 with a determination result indicating system stop, i.e. stop of the abnormality notification function. The integrated ECU 201 transmits a processing request indicating the determination result to the area ECU 101.

The abnormality notification function performs system restart by starting the boot loader or system stop by waiting until hardware reset or the like is performed on the processor 51, according to the instruction from the integrated ECU 201, i.e. the processing request received from the integrated ECU 201. For example, in the case of system stop, other software remains stopped due to memory exception processing.

The abnormality notification function may be configured to perform system restart or system stop without receiving a processing request from the integrated ECU 201.

The integrated ECU 201 is not limited to being configured to transmit a processing request to the area ECU 101, and may be configured to transmit an abnormality notification to a navigation device or the like in the vehicle 1 or configured to transmit an abnormality notification to another device such as a server outside the vehicle 1.

Figure 5:
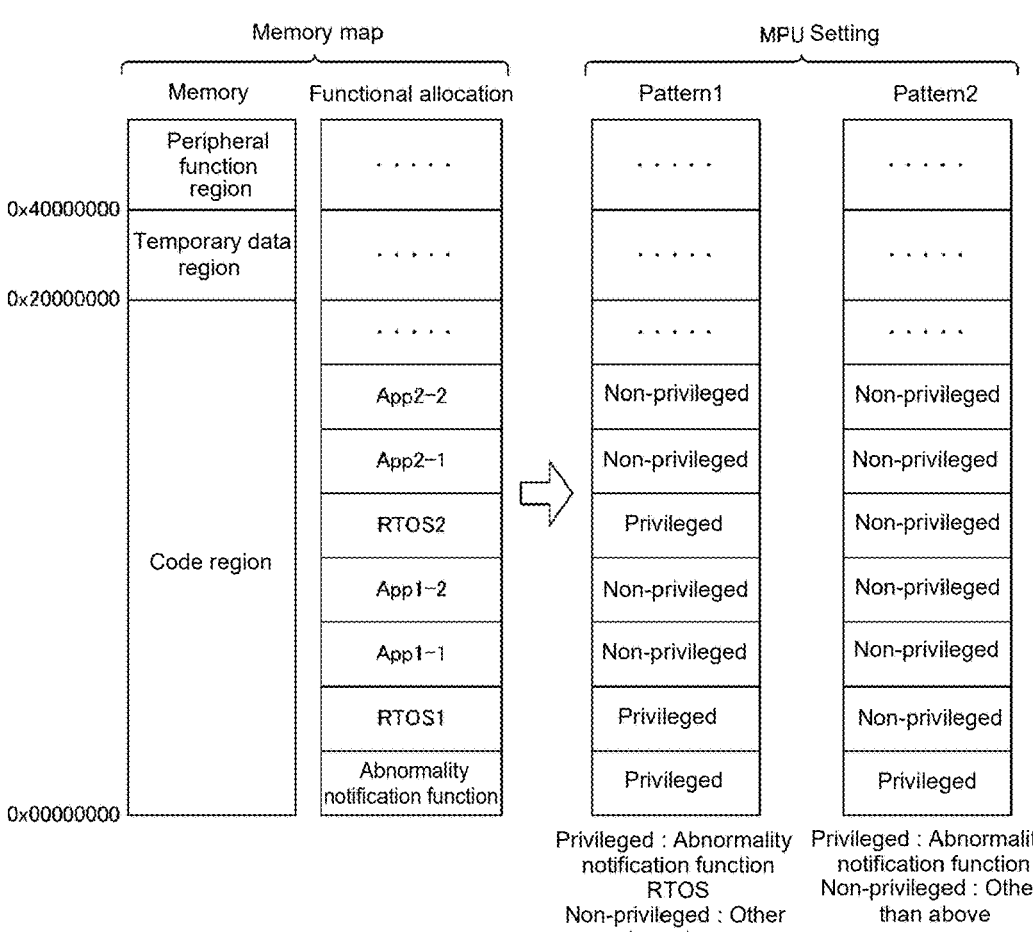
FIG. 5 is a diagram showing an example of a memory map and MPU settings of a processor in a comparative example of the area ECU according to the embodiment of the present disclosure.

FIG. 5 is a diagram showing an example of a memory map and MPU settings of a processor in a comparative example of the area ECU according to the embodiment of the present disclosure. FIG. 5 shows a case where the processor includes one core, one abnormality notification function, two RTOSs, and a plurality of applications.

Referring to FIG. 5, since the processor in the comparative example can set only two authority levels, any two of the abnormality notification function; each RTOS; and each application need to share the same authority level. This may cause a security problem.

Specifically, in the MPU settings of pattern 1, privileged level is set for the abnormality notification function and each RTOS, and non-privileged level is set for each application. In this case, the RTOS is not hijacked even if the application is hijacked, but there is a possibility that the abnormality notification function is hijacked if the RTOS is hijacked.

In the MPU settings of pattern 2, privileged level is set for the abnormality notification function, and non-privileged level is set for each RTOS and each application. In this case, the abnormality notification function is not hijacked even if the RTOS is hijacked, but there is a possibility that the RTOS is hijacked if the application is hijacked. Thus, the security of the RTOS decreases.

Figure 6:
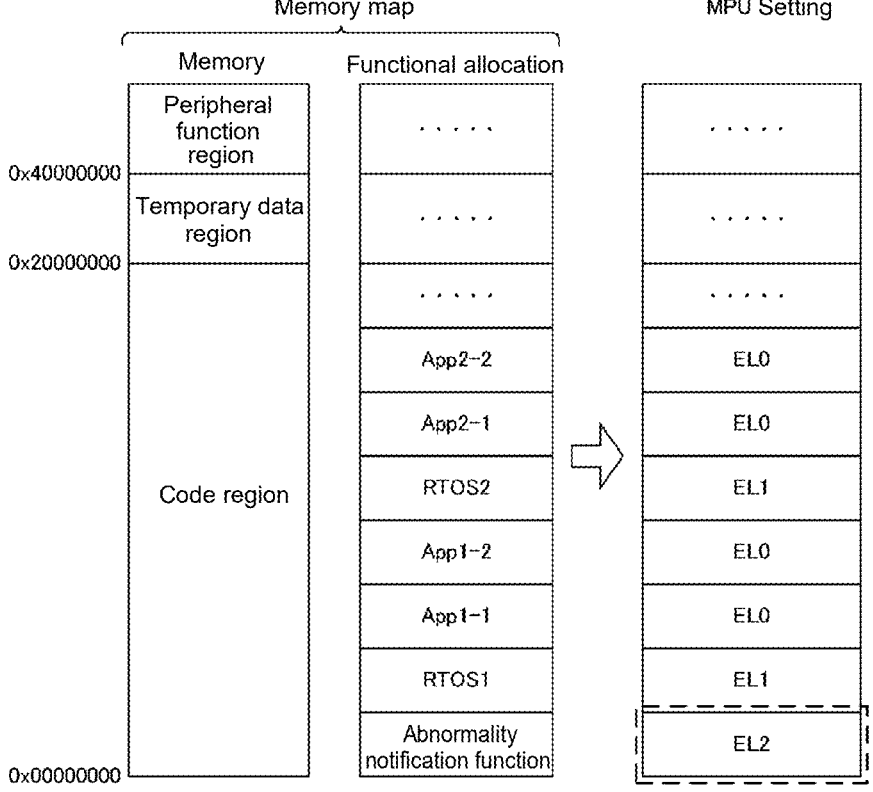
FIG. 6 is a diagram showing an example of a memory map and MPU settings of the processor in the area ECU according to the embodiment of the present disclosure.

FIG. 6 is a diagram showing an example of a memory map and MPU settings of the processor in the area ECU according to the embodiment of the present disclosure. FIG. 6 shows a case where the processor includes one core, one abnormality detection function, two RTOSs, and a plurality of applications, as in FIG. 5.

Referring to FIG. 6, the processor 51 can set three authority levels EL0, EL1, and EL2. Hence, EL2, EL1, and EL0 can be set respectively for the abnormality notification function, each RTOS, and each application as described above, with it being possible to improve security. Specifically, the RTOS can be prevented from being hijacked even if the application is hijacked, and the abnormality notification function can be prevented from being hijacked even if the RTOS is hijacked.

Operation Flow

The vehicle-mounted device according to the embodiment of the present disclosure includes a computer including memory, and a processor in the computer reads, from the memory, a program including some or all of the steps of the below-described flowchart and sequence and executes the program. The program can be installed from the outside. The program is distributed in a state of being stored on a recording medium or via a communication line.

Figure 7:
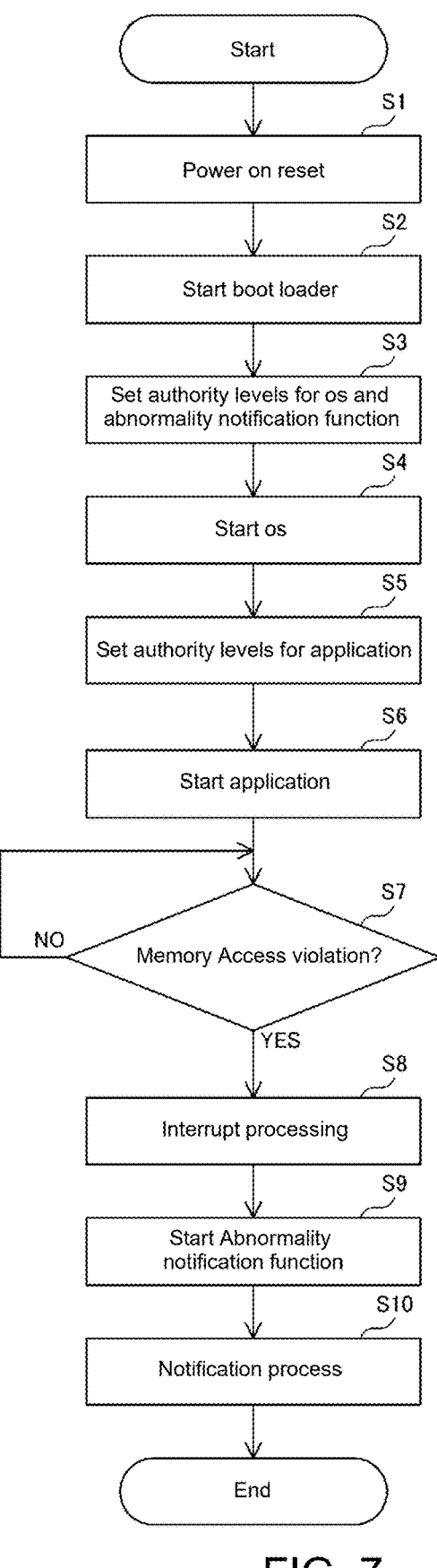
FIG. 7 is a flowchart showing an example of an operation procedure when the processor in the vehicle-mounted device according to the embodiment of the present disclosure detects a memory access violation.

FIG. 7 is a flowchart showing an example of an operation procedure when the processor in the vehicle-mounted device according to the embodiment of the present disclosure detects a memory access violation.

Referring to FIG. 7, first, when the processor 51 is powered on or reset (step S1), the boot loader is started at authority level EL2 (step S2).

The boot loader then sets authority levels EL1 and EL2 for the RTOS and the abnormality notification function respectively, according to the MPU settings in the memory 14 (step S3).

The boot loader then starts the RTOS (step S4).

Following this, the RTOS sets authority level EL0 for each application according to the MPU settings in the memory 14 (step S5).

The RTOS then starts each application (step S6).

Subsequently, if a memory access violation by the RTOS or application is detected (step S7: YES), interrupt processing occurs as memory exception processing (step S8), and the abnormality notification function is started by the interrupt processing (step S9).

Following this, as a notification process, for example the abnormality notification function initializes itself and the functions of the processor 51 necessary for abnormality notification and transmits an abnormality notification to the integrated ECU 201 (step S10).

Figure 8:
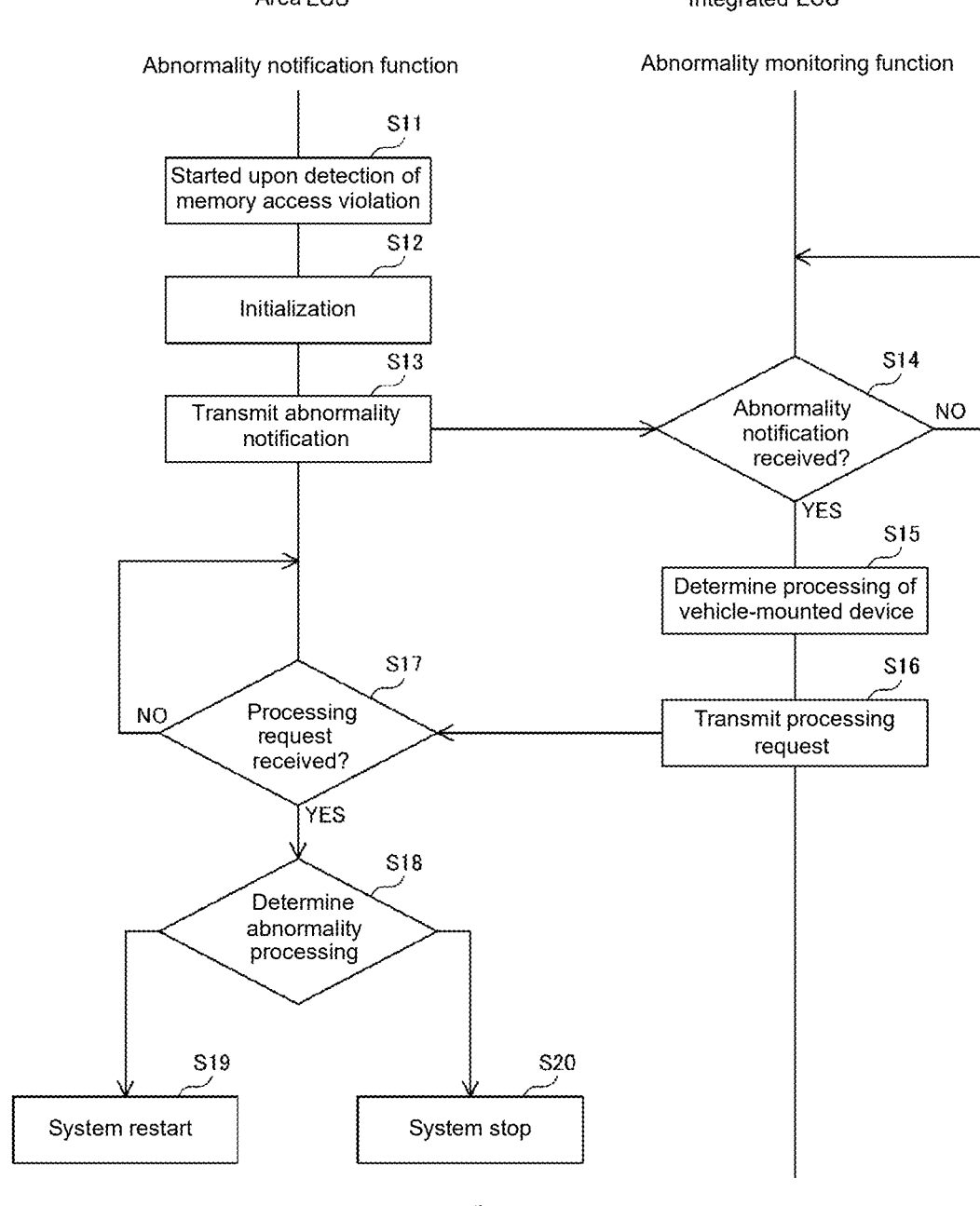
FIG. 8 is a diagram showing an example of a processing sequence of an abnormality notification function and an abnormality monitoring function in the vehicle-mounted system according to the embodiment of the present disclosure.

FIG. 8 is a diagram showing an example of a processing sequence of the abnormality notification function and the abnormality monitoring function in the vehicle-mounted system according to the embodiment of the present disclosure.

Referring to FIG. 8, first, the abnormality notification function in the area ECU 101 is started upon detection of a memory access violation (step S11).

The abnormality notification function then initializes itself and the functions of the processor 51 necessary for abnormality notification (step S12), and transmits an abnormality notification to the integrated ECU 201 (step S13).

Having received the abnormality notification from the area ECU 101 (step S14: YES), the abnormality monitoring function in the integrated ECU 201 determines processing to be performed in the area ECU 101. Specifically, for example, the abnormality monitoring function determines to perform system restart if the transmitter of the abnormality notification is an infotainment ECU such as an ECU related to car navigation or an ECU related to audio, and determines to perform system stop if the transmitter is not an infotainment ECU (step S15).

The abnormality monitoring function then transmits a processing request indicating the determination result to the area ECU 101 (step S16).

Having received the processing request from the integrated ECU 201 (step S17: YES), the abnormality notification function in the area ECU 101 determines abnormality processing according to the processing request (step S18), and performs system restart (step S19) or system stop (step S20).

The vehicle-mounted device according to the embodiment of the present disclosure is equipped with a host intrusion detection system (IDS) as described above. In more detail, intrusion detection is a process of monitoring events occurring in a computer system or a network and analyzing the monitoring results to detect signs of possible incidents. An IDS is software having a function of automating an intrusion detection process. A host IDS is an IDS that monitors events occurring within a single host such as a microcomputer or microprocessor and notifies a detection master. One type of host IDS has a function of detecting unauthorized access to memory regions as software.

The foregoing embodiments are illustrative and not restrictive in all respects. The scope of the present disclosure is defined by the claims, and not the above description, and is intended to include all modifications within the meaning and scope equivalent to the claims.

The invention claimed is:

1. A vehicle-mounted device comprising:

a processor comprising a core is capable of:

setting three or more authority levels related to memory access, wherein a higher authority level than authority levels of an operating system (OS) and an application is set for an abnormality notification function of notifying a memory access violation to an outside of the vehicle-mounted device; and detecting the memory access violation by the OS or the application and starting the abnormality notification function to notify the memory access violation, wherein after notifying the memory access violation, the abnormality notification function selects whether to stop the abnormality notification function or restart the processor based on a determination result of a notification destination regarding the memory access violation, wherein the determination result provided to the vehicle-mounted device that has notified the memory access violation indicates restart of the processor if the vehicle-mounted device is an infotainment vehicle-mounted device, and indicates stop of the abnormality notification function if the vehicle-mounted device is not the infotainment vehicle-mounted device.

2. The vehicle-mounted device according to claim 1, wherein the processor is capable of setting a first authority level, a second authority level higher than the first authority level, and a third authority level higher than the second authority level, and the first authority level is set for the application, the second authority level is set for the OS, and the third authority level is set for the abnormality notification function.

3. The vehicle-mounted device according to claim 2, wherein in the processor, the third authority level is further set for a boot loader.

4. An information processing method in a vehicle-mounted device that includes a processor capable of setting three or more authority levels related to memory access, the information processing method comprising:

a step in which the processor sets a higher authority level than authority levels of an operating system (OS) and an application for an abnormality notification function of notifying a memory access violation to an outside of the vehicle-mounted device; and a step in which the processor detects the memory access violation by the OS or the application and starts the abnormality notification function to notify the memory access violation, wherein after notifying the memory access violation and based on a determination result of a notification destination regarding the memory access violation, the abnormality notification function selects at least one of to: stop the abnormality notification function or restart the processor, wherein the determination result provided to the vehicle-mounted device that has notified the memory access violation indicates restart of the processor when the vehicle-mounted device is an infotainment vehicle-mounted device, and indicates stop of the abnormality notification function when the vehicle-mounted device is not the infotainment vehicle-mounted device.

5. The information processing method according to claim 4, wherein the processor is capable of setting a first authority level, a second authority level higher than the first authority level, and a third authority level higher than the second authority level, and Wherein the first authority level is set for the application, the second authority level is set for the OS, and the third authority level is set for the abnormality notification function.

6. The information processing method according to claim 5, wherein in the processor, the third authority level is further set for a boot loader.

7. A non-transitory computer-readable storage medium comprising an information processing program executable in a vehicle-mounted device that includes a processor capable of setting three or more authority levels related to memory access, the information processing program being executed by a computer to:

set a higher authority level than authority levels of an operating system (OS) and an application for an abnormality notification function of notifying a memory access violation to an outside of the vehicle-mounted device; and detect the memory access violation by the OS or the application and start the abnormality notification function to notify the memory access violation, wherein after notifying the memory access violation, the abnormality notification function selects whether to stop the abnormality notification function or restart the processor based on a determination result of a notification destination regarding the memory access violation, wherein the determination result provided to the vehicle-mounted device that has notified the memory access violation indicates restart of the processor if the vehicle-mounted device is an infotainment vehicle-mounted device, and indicates stop of the abnormality notification function if the vehicle-mounted device is not the infotainment vehicle-mounted device.

8. The non-transitory computer-readable storage medium according to claim 7, wherein the processor is capable of setting a first authority level, a second authority level higher than the first authority level, and a third authority level higher than the second authority level, and Wherein the first authority level is set for the application, the second authority level is set for the OS, and the third authority level is set for the abnormality notification function.

9. The non-transitory computer-readable storage medium according to claim 8, wherein in the processor, the third authority level is further set for a boot loader.

* * * * *